(12) United States Patent
Browne et al.

(10) Patent No.: US 7,905,530 B2
(45) Date of Patent: Mar. 15, 2011

(54) SELF-ACTUATING DEVICES

(75) Inventors: Alan L. Browne, Grosse Pointe, MI (US); Nancy Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/199,887

(22) Filed: Aug. 28, 2008

(65) Prior Publication Data

US 2009/0243319 A1 Oct. 1, 2009

Related U.S. Application Data

(60) Provisional application No. 61/041,381, filed on Apr. 1, 2008.

(51) Int. Cl.
*B60J 5/10* (2006.01)
(52) U.S. Cl. .......................... 296/1.02; 296/56
(58) Field of Classification Search ................ 296/1.02, 296/146.1, 146.2, 152, 153, 146.14, 146.8, 296/50, 56, 57.1, 71
See application file for complete search history.

(56) References Cited

U.S. PATENT DOCUMENTS

| | | | |
|---|---|---|---|
| 5,820,205 A | 10/1998 | Ammons | |
| 6,431,643 B2 | 8/2002 | Grey | |
| 6,715,813 B2 * | 4/2004 | Thompson et al. | 296/1.02 |
| 6,979,050 B2 | 12/2005 | Browne et al. | |
| 6,991,280 B2 | 1/2006 | McKnight et al. | |
| 7,108,301 B2 | 9/2006 | Louvel | |
| 7,118,160 B2 * | 10/2006 | Willard | 296/107.01 |
| 7,176,413 B2 | 2/2007 | Zanella et al. | |
| 7,219,949 B1 * | 5/2007 | Plavetich et al. | 296/146.2 |
| 7,252,313 B2 | 8/2007 | Browne et al. | |
| 7,270,359 B2 * | 9/2007 | Sparks et al. | 296/1.02 |
| 7,331,616 B2 | 2/2008 | Brei et al. | |
| 7,332,688 B2 | 2/2008 | Browne et al. | |
| 7,621,573 B2 * | 11/2009 | Thomas et al. | 296/1.02 |
| 7,631,915 B2 * | 12/2009 | Browne et al. | 296/1.02 |
| 2004/0031301 A1 | 2/2004 | Dominque | |
| 2005/0217390 A1 * | 10/2005 | Conner et al. | 73/862.393 |
| 2006/0267376 A1 | 11/2006 | McKnight et al. | |
| 2007/0216194 A1 | 9/2007 | Rober et al. | |
| 2008/0133090 A1 | 6/2008 | Browne et al. | |
| 2008/0217941 A1 | 9/2008 | Chernoff et al. | |
| 2009/0108607 A1 * | 4/2009 | Browne et al. | 296/1.02 |
| 2009/0243319 A1 * | 10/2009 | Browne et al. | 296/1.02 |

FOREIGN PATENT DOCUMENTS

| | | |
|---|---|---|
| JP | 06336135 | 12/1994 |
| JP | 2000118284 | 4/2000 |
| JP | 2005119452 | 5/2005 |

\* cited by examiner

*Primary Examiner* — Glenn Dayoan
*Assistant Examiner* — Gregory Blankenship
(74) *Attorney, Agent, or Firm* — Quinn Law Group, PLLC

(57) ABSTRACT

A self-actuating device includes a member in physical communication with a vehicle surface and an actuator. The member is configured to have at least a first form and a second form, wherein one of the first form and the second form is configured to stow the member and the other of the first form and the second form is configured to present the member. The actuator is in operable communication with the member. The actuator is actuated upon receipt of an activation signal and is effective to transition the member from one of the forms to another of the forms.

18 Claims, 10 Drawing Sheets

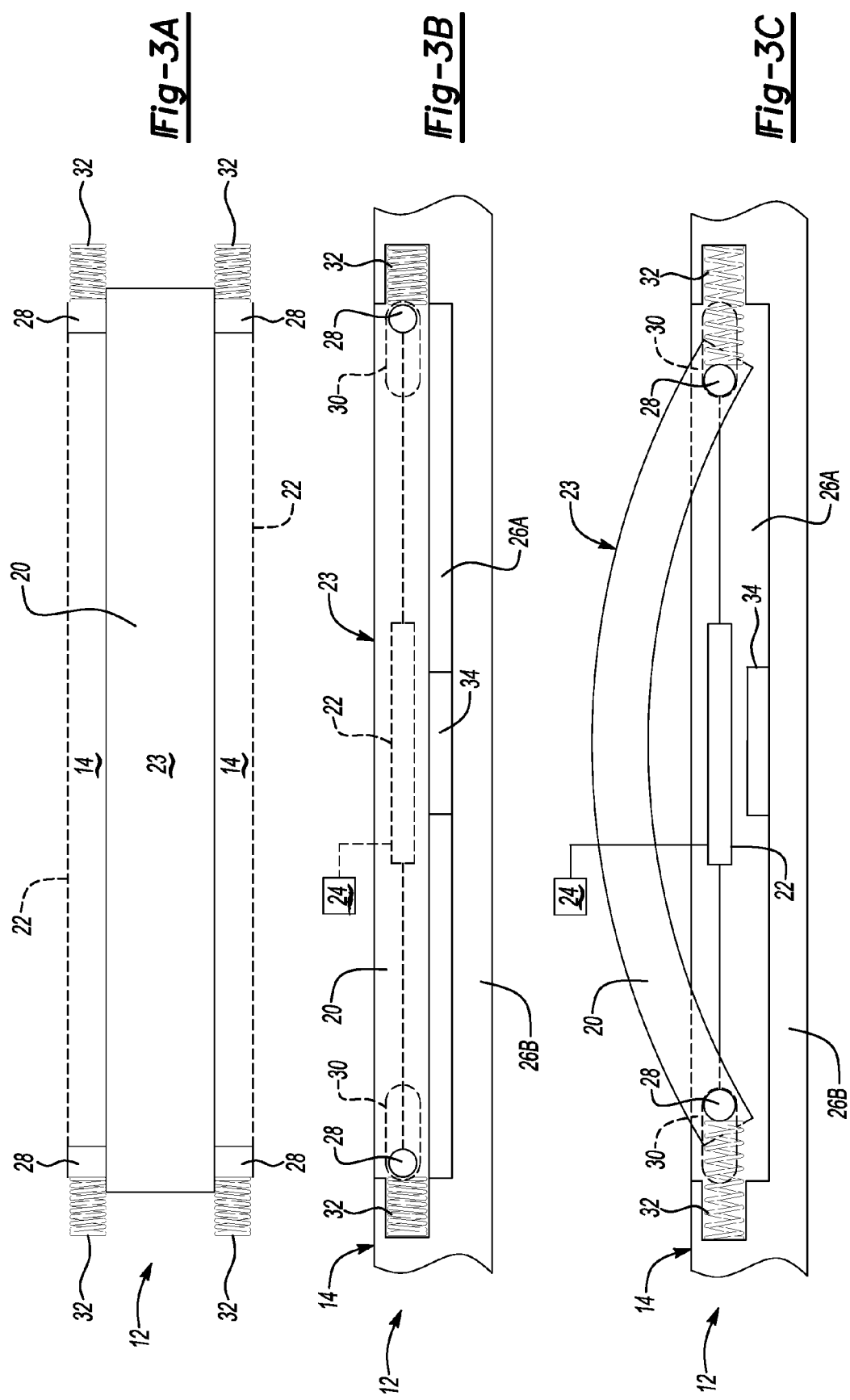

SELF-ACTUATING DEVICES

CROSS-REFERENCE TO RELATED APPLICATIONS

This application claims the benefit of U.S. Provisional Application 61/041,381, filed Apr. 1, 2008, which is hereby incorporated by reference in its entirety.

TECHNICAL FIELD

The present invention relates generally to stowable devices that adopt a functional geometry only upon demand and, more particularly to stowable devices that either present this functional geometry to the user for enhanced ease of use, i.e. self-presenting devices, or stow the functional geometry to provide enhanced interior spaciousness and flush exterior profiles for improved aerodynamic and appearance differentiation, i.e. self-stowing devices. These devices will be collectively termed self-actuating devices.

BACKGROUND OF THE INVENTION

Motor vehicles and other transportation means such as airplanes, buses and trains have multiple handles, levers, hooks, and the like on the exterior and throughout the interior compartment. In motor vehicles, for instance, such devices have a myriad of uses, such as grab handles for assisting egress/ingress from the vehicle, hood and/or trunk-release handles, door handles, garment hooks, tailgate handles, liftgate assist handles and the like. Most, if not all, of these devices are infrequently used but are permanently fixed to the vehicle's interior and/or exterior. For example, in the case of an interior grab handle, the handle permanently occupies interior space and affects interior styling design.

Accordingly, there is a need for improved self-actuating devices that do not affect styling designs and aesthetics, and in the case of the interior compartment, devices that increase interior space.

SUMMARY OF THE INVENTION

Disclosed herein are self-actuating devices, including self-presenting devices and self-stowing devices, in accordance with exemplary embodiments.

In one embodiment, a self-presenting device is provided. The self-presenting device includes a member in physical communication with a surface and an activation device in operable communication with the member. The member is configured to have a first form and a second form. The first form is configured to stow the member and the second form is configured to present the member. The activation device is configured to present the member upon receipt of an activation signal and to stow the member upon removal of the activation signal. Alternatively, the activation device can be configured to stow the member upon receipt of the activation signal and to present the member upon removal of the activation signal.

Further, the activation device can include but is not limited to, for example, a mechanical actuator, an electrically controlled actuator (electrohydraulic, electromechanical, or electromagnetic), a hydraulically controlled actuator, a pneumatically controlled actuator, a magnetically controlled actuator, and/or any combination of the aforementioned.

In another embodiment, a self-stowing device is provided. The self-stowing device includes a member in physical communication with a surface and an activation device in operable communication with the member. The member is configured to have a first form and a second form. The first form is configured to present the member and the second form is configured to stow the member. The activation device is configured to stow the member upon receipt of an activation signal and to present the member upon removal of the activation signal. Alternatively, the activation device can be configured to present the member upon receipt of the activation signal and to stow the member upon removal of the activation signal.

In yet another embodiment, a self-presenting handle assembly includes a handle portion in operative communication with an axle rotatably mounted in a housing of a rigid support, and an activation device in operative communication with the axle or the handle portion. The activation device is configured to provide rotation of the axle in a first direction and move the handle in the first direction from a first position to a second position.

Alternatively, in another embodiment, an antagonistic arrangement of self-actuated actuators is provided to rotate the handle portion between the first position and the second position.

A method of self-presenting a device is provided, which includes activating an actuator in operative communication with a member and transitioning the member from the first form, which is configured to stow the member, to the second form, which is configured to present or deploy the member. An activation device is configured to actuate the actuator to present the member upon receipt of an activation signal and to stow the member upon removal of the activation signal. Alternatively, the activation device can be configured to stow the member upon receipt of the activation signal and to present the member upon removal of the activation signal.

A method of self-presenting a handle in a vehicle includes activating an actuator in operative communication with the axle or the handle portion. An activation device is configured to actuate the actuator to provide rotation of the axle in a first direction and move the handle in the first direction from a first position to a second position.

A method of self-stowing a device is provided, which includes activating an actuator in operative communication with a member and transitioning the member from a first form, which is configured to present or deploy the member, to the second form, which is configured to stow the member. An activation device is configured to actuate the actuator upon receipt of an activation signal and actuation of the actuator is effective to transition the member from the first form to the second form.

The above features and advantages and other features and advantages are readily apparent from the following detailed description of the preferred embodiments when taken in connection with the accompanying drawings.

BRIEF DESCRIPTION OF THE DRAWINGS

Referring now to the figures, which are exemplary embodiments and wherein the like elements are numbered alike:

FIG. 3A is a plan view of another exemplary embodiment of an actuator enabled self-presenting device according to the present invention;

FIG. 3B is a side view of the exemplary embodiment of the actuator enabled self-presenting device of FIG. 3A in a stowed position;

FIG. 3C is a side view of the exemplary embodiment of the actuator enabled self-presenting device of FIG. 3A in a presented position;

DETAILED DESCRIPTION

Self-actuating devices include self-presenting devices, self-stowing devices, and devices that both self-present and self-stow. Self-presenting devices include devices that are initially stowed substantially flush to or within an interior or exterior trim panel and presented for use by a user by activation of an actuator. Self-stowing devices include devices that are initially visible and available for use by a user in a presented configuration and stowed substantially flush to or within an interior or exterior trim panel upon activation of an actuator.

Self-presenting devices, self-stowing devices and methods of their use in a vehicle are described herein. In contrast to existing handles, garment hooks, and the like, the self-presenting devices disclosed herein advantageously employ actuators. The self-actuating devices as described comprise an activation device including an actuator that permits the self-actuating device to reversibly present itself in response to an activation signal. The term "device" as used herein generally refers to any functional component. Examples include, without limitation, grab handles, garment hooks, door handles, hood releases, trunk releases, fuel-door releases, tailgate handles, liftgate assist handles, and the like, found in most transportation means, and more specifically in a motor vehicle.

The self-actuating devices as disclosed herein, however, have general utility beyond transportation means. The self-actuating devices can be employed in other applications such as, without limitation, luggage, shipping containers, drawers and cabinets, storage containers, and the like, where a permanently affixed, protruding handle could advantageously be replaced by the self-actuating handle disclosed herein.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). Furthermore, all ranges disclosed herein are inclusive of the endpoints and independently combinable.

Figure 1:
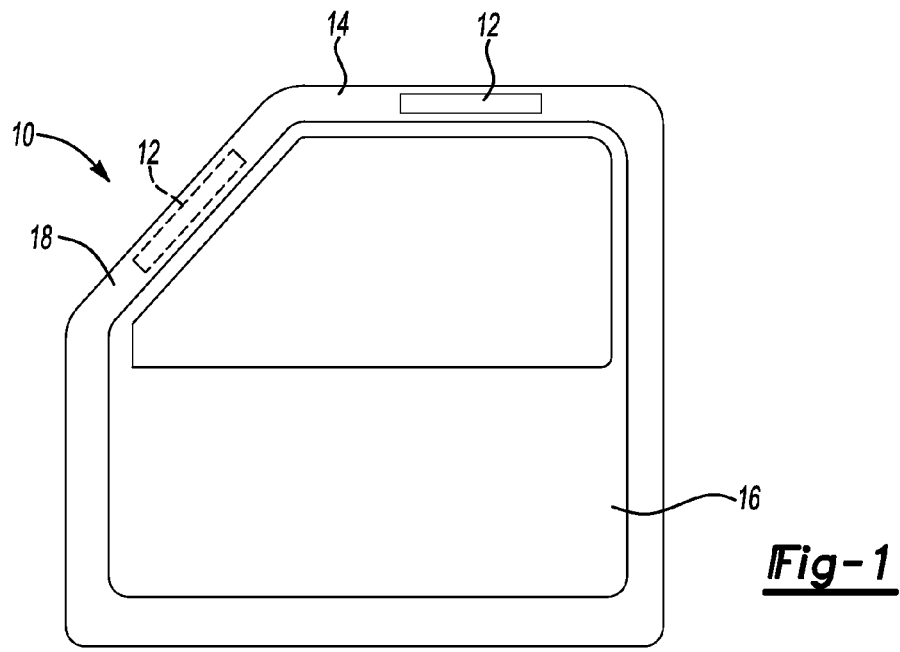
FIG. 1 is a plan view of a door in a vehicle interior compartment with an actuator enabled self-presenting device according to the present invention.

Referring now to FIG. 1, a partial perspective view of a vehicle interior compartment is illustrated and generally designated by reference numeral 10. In this embodiment, a self-presenting device 12, in this case a grab handle, is in physical communication with a vehicle surface 14, in this case a roof line of the vehicle interior compartment 10, just above a vehicle door 16. In another embodiment, the self-presenting device 12 can be located on the vehicle's A-pillar 18. While the self-presenting device 12 in this embodiment is a grab handle (i.e., assist handle), it is to be understood that the actuator enabled self-presenting devices disclosed herein can be used for any functional component, such as garment hooks, hood, trunk, and fuel-door release handles, door handles, tailgate assist handles, and the like, and can be disposed anywhere on and/or in the vehicle.

Figure 2A:
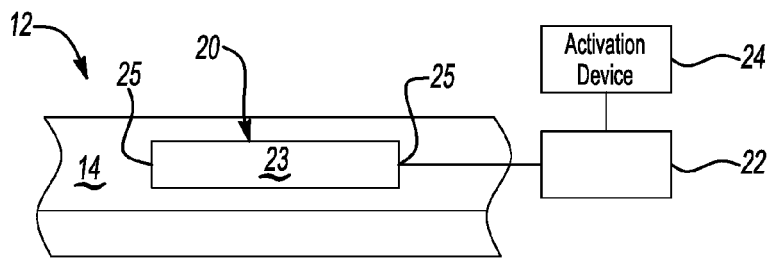
FIG. 2A is a plan view of an exemplary embodiment of an actuator enabled self-presenting device according to the present invention in a stowed position.
Figure 2B:
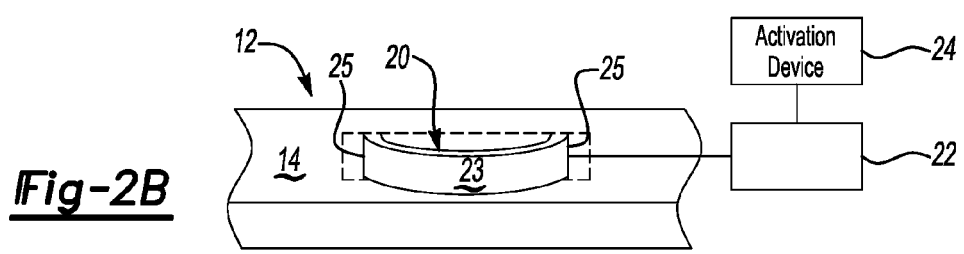
FIG. 2B is a plan view of the exemplary embodiment of the actuator enabled self-presenting device of FIG. 2A in a presented position where ends of the member are moveable.
Figure 2C:
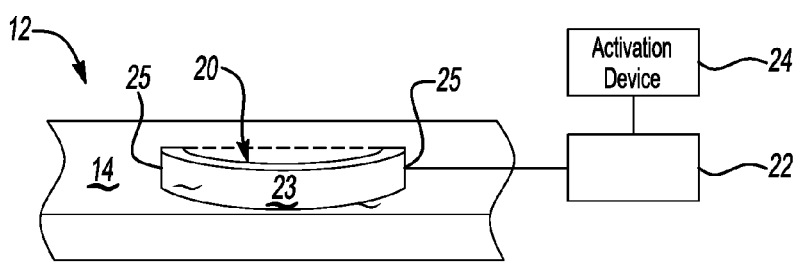
FIG. 2C is a plan view of the exemplary embodiment of the actuator enabled self-presenting device of FIG. 2A in a presented position where ends of the member are fixed.

In FIGS. 2A-2C, the self-presenting grab handle 12 is shown in greater detail. The self-presenting grab handle 12 comprises a member 20 and an actuator 22 in communication with the member 20. In this embodiment, the member 20 is comprised of a pliable material, for example but not limited to, an elastically deformable polymer.

The actuator 22 can be, but is not limited to, a mechanical actuator that is electrically controlled, an electrically controlled hydraulic actuator, an electrically controlled pneumatic actuator, or an electrically controlled magnetic actuator.

In an exemplary embodiment, the member 20 has a first form, i.e. structure, position, or shape, as shown in FIG. 2A, wherein the actuator 22 is in a passive mode, i.e., wherein no activation signal is being applied to the actuator 22. The first form of the member 20 can comprise a surface 23 that is coplanar to the surface 14 of the vehicle, such as the roof line, and is configured to stow the self-presenting device 12.

Upon receipt of an activation signal from the activation device 24, the actuator 22 is effective to transition the member 20 to a second form, as shown in FIG. 2B or FIG. 2C. The second form is configured to present, i.e., deploy, the member 20 thereby making it accessible to a user. As used herein, the term "stow" generally refers to a position of the self-presenting device in which the self-presenting device occupies less vehicle interior space or protrudes less from an exterior surface over current vehicle functional components and the self-presenting device itself when in the presented position. For example, in one embodiment, the self-presenting device, when stowed, is recessed into a cavity or a holder which is located within the vehicle compartment 10.

In another embodiment, the self-presenting device can simply be folded to increase interior compartment space, but is not completely recessed into the vehicle interior, such that the surfaces of the self-presenting device and the vehicle interior are not coplanar (i.e., flush).

The activation device 24 is coupled to and in operative communication with the self-presenting device 12. The activation device 24 is operable to selectively provide an activation signal to the self-presenting device 12 to alter a feature of the member 20 by selectively activating the actuator 22. The activation signal provided by the activation device 24 can include a heat signal (such as in the case of a bimetallic strip actuator), a magnetic signal, an electrical signal, a pneumatic signal, a hydraulic signal, a mechanical signal, and the like, and combinations comprising at least one of the foregoing signals, with the particular activation signal dependent on the materials and/or configuration of the actuator.

In one embodiment, the actuator enabled self-presenting device 12 can reversibly self-present by bowing the member 20. As seen in FIG. 2A, when in the first form, the member 20 has a substantially straight and/or planar shape. Upon exposure to an activation signal from the activation device 24, the actuator 22 actuates to transition the member 20 from the first form to the second form. In this embodiment, the transition from the first form to the second form comprises moving the ends 25 of the member 20 such that the distance between the two ends 25 decreases causing the member 20 to bow outward away from the vehicle surface 14 and inward toward the vehicle interior compartment 10.

Referring now to FIGS. 3A-3C, the self-presenting device of FIG. 2A is illustrated in greater detail. FIG. 3A illustrates a plan view of the self-presenting device 12 comprising the member 20 set in a cavity 26A formed by a frame 26B. To prevent bowing inward and to force the member 20 to deploy outward, a stop 34 is incorporated in the frame 26B to slightly bias the stowed location of the member 20 to the outward direction so that applying an axial compressive load to the member 20 would accentuate the curvature and fully deploy the member 20 for presentation to the user.

FIG. 3B shows a side view of the self-presenting device 12 and demonstrates that the surface 23 of the member 20, when in the first form (i.e., stowed and substantially flat), is flush with the vehicle surface 14 of the frame 26B. Moreover, the member 20, when in the first form, has the same plan view dimension as the cavity 26A and, therefore, fills the cavity 26A such that the member/cavity combination approximates a single unbroken surface. Pins 28 are rigidly attached to the member 20 and are constrained to travel within slots 30 of the frame 26B. The pins 28 protrude laterally from the member 20. The pins 28 are connected to one another by the actuator 22, which is in operable communication with the activation device 24.

In operation, as illustrated in FIG. 3C, the actuator 22 receives an activation signal from the activation device 24 and actuates, pulling the pins 28 inward to deploy the member 20 to the second form for presentation to the user. The actuation is effective to overcome a restraining force exerted by return springs 32, which are mounted between the pins 28 and the frame 26B. The return springs 32 are configured to return the member 20 back to the first or stowed form when the actuation signal is discontinued.

Figure 4A:
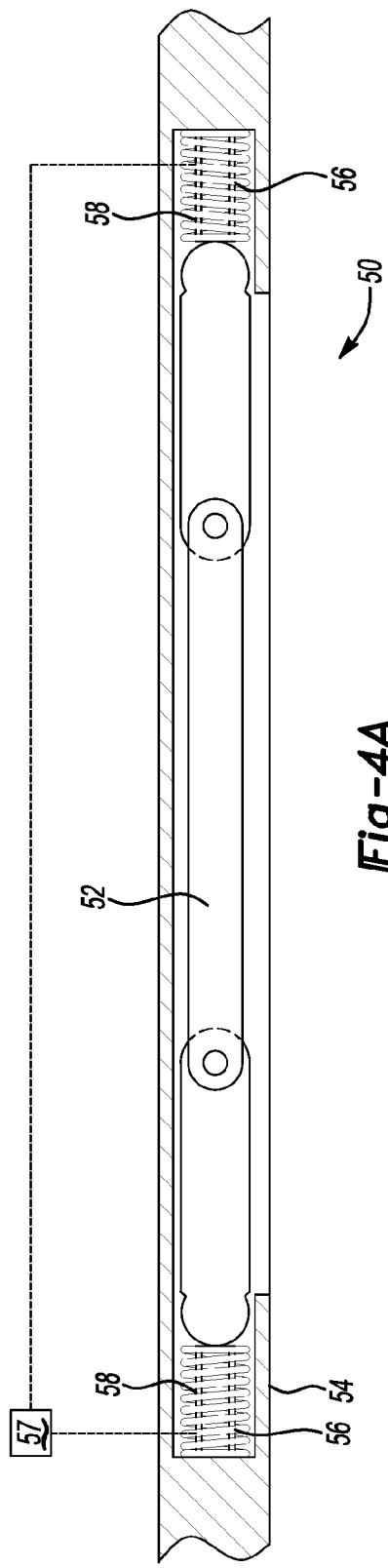
FIG. 4A is a side view of yet another exemplary embodiment of an actuator enabled self-presenting device according to the present invention in a stowed position.
Figure 4B:
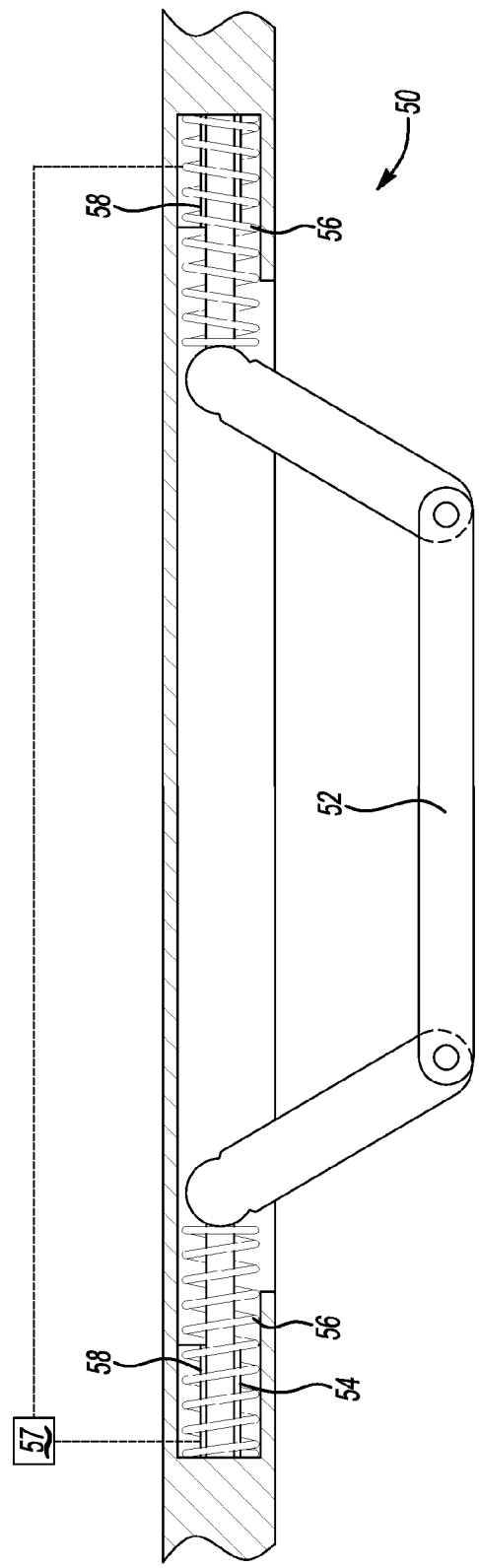
FIG. 4B is a side view of the exemplary embodiment of the actuator enabled self-presenting device of FIG. 4A in a presented position.

In FIGS. 4A-4B, yet another embodiment of an actuator enabled self-presenting device 50 is illustrated. The self-presenting device 50 can reversibly self-present through a rigid body translation of a hingeable member 52 toward a vehicle interior compartment 10 or outward from a vehicle exterior surface. As illustrated in FIG. 4A, the self-presenting device 50 is a grab handle positioned in a roof line 54 of a vehicle interior compartment 10. The self-presenting grab handle 50 comprises the hingeable member 52, actuators 56, and bias springs 58 in communication with the hingeable member and an activation device 57.

When the self-presenting grab handle 50 is in a first form, the member 52 is configured to be in a stowed position, against a vehicle interior component, in this case, the roof line 54. Upon receipt of an activation signal from the activation device 57, the actuators 56 activate to extend inward, which is effective to transition the self-presenting grab handle 50 from the first form to a second form, wherein the actuators 56 hingeably translate the hingeable member 52 away from the roof line 54 and into the vehicle interior compartment 10 such that it is accessible to a user. FIG. 4B illustrates the self-presenting grab handle 50 in the presented, second form position.

In one embodiment, the reverse of the transition can be used to return the self-presenting device 50 from the second form to the first form, i.e., to stow the device. In other words, terminating the activation signal can be effective to cause the actuators 56 to retract, thereby returning the hingeable member 52 from the second form to the first form.

Whatever the mode of activation, it is advantageous that the member be stowed when in the passive mode, therefore no power is required for the continuous storage of the self-presenting device. In other words, the only power required by the self-presenting device is for the short duration in which the member must be presented for use, such as opening of the vehicle door. If, however, for some reason the member must be presented for a longer than normal duration, or if the function of the self-presenting device is one in which prolonged deployment is required, for instance garment hooks, then a locking mechanism or a detent mechanism may be added to the self-presenting device. Suitable locking mechanisms can include, without limitation, bolts, latches, pins, magnets, and the like.

Figure 5:
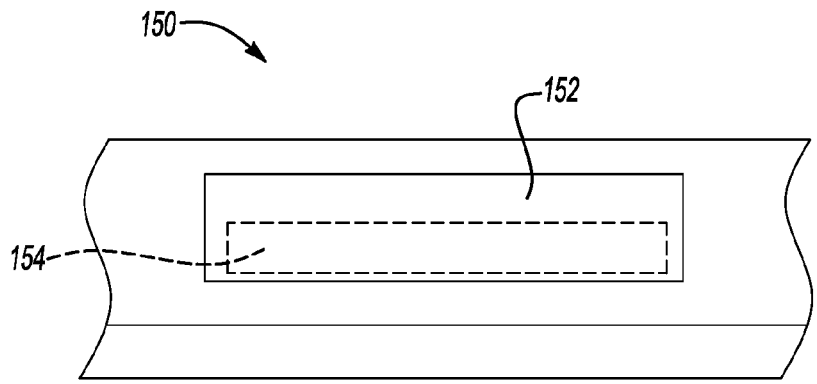
FIG. 5 is an exemplary embodiment of an actuator enabled self-presenting device according to the present invention comprising a concealment flap, wherein the device is in a stowed position and is concealed by the flap.

Turning now to FIG. 5, yet another embodiment of a self-presenting device 150 is illustrated. In this embodiment, the self-presenting device 150 further includes a concealment flap 152. The concealment flap 152 can be used in combination with any self-presenting device 150 where selectively covering, hiding, and/or protecting the self-presenting device 150 is beneficial. The concealment flap 152 can be used to conceal the member 154, which is shown as a dashed outline because it is hidden behind the concealment flap 152 when in the first form (stowed position). The concealment flap 152 can be configured to actively move, such as through the use of additional mechanical actuators and the like to reveal the self-presenting device 150. Or the concealment flap 152 can be configured to passively move, wherein the concealment flap 152 is comprised of a flexible low-modulus material capable of being pushed aside by the member 154 of the self-presenting device 150 as it transitions from the first form to the second form.

Figure 6A:
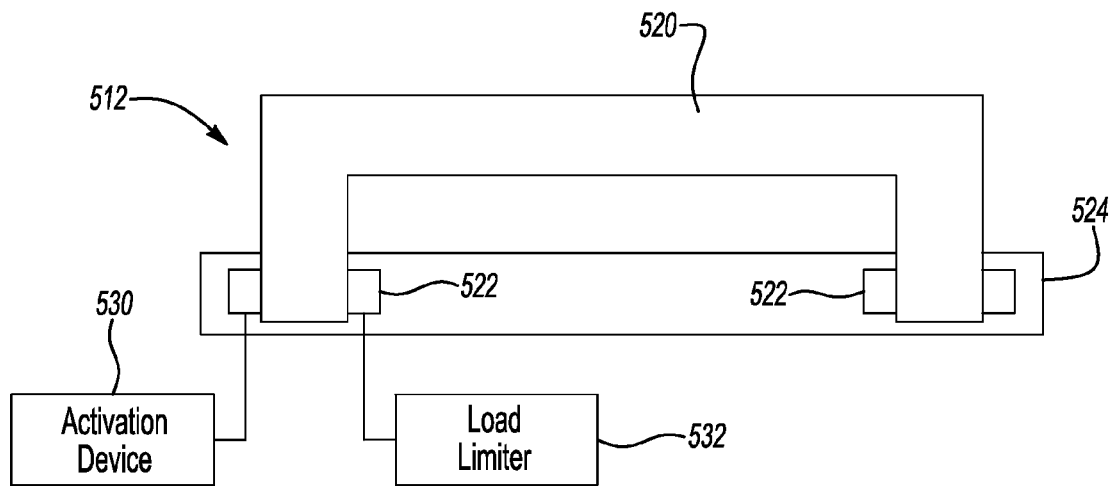
FIG. 6A is a plan view of another exemplary embodiment of an actuator enabled self-presenting device according to the present invention.
Figure 6B:
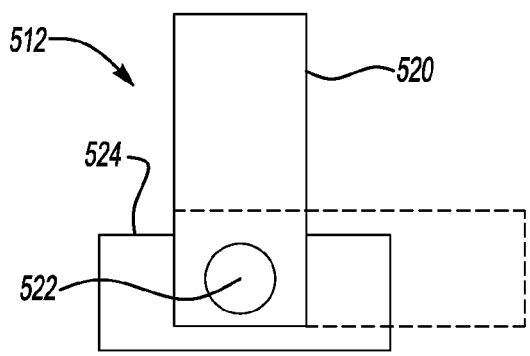
FIG. 6B is a side view of the actuator enabled self-presenting device of FIG. 6A.

In yet another embodiment, as illustrated in FIGS. 6A-6B, a self-presenting handle assembly 512 comprises a handle portion 520 and axles 522 in operative communication with the handle portion 520. The axles 522 are rotatably mounted in a housing (not shown) of a rigid support 524. An activation device 530 and a load limiter 532 are coupled to and in operative communication with the self-presenting handle assembly 512. In one embodiment the rigid support 524 can be mounted directly to the vehicle interior 10, such as on vehicle surface 14. The axles 522 are configured to permit rotation of the handle portion 520 from a first position to a second position.

In one configuration, the handle portion 520 is rigidly attached to the axle 522 and an actuator is in direct operable communication with either the handle portion 520 or the axle 522. Alternatively, the handle portion 520 can be rotatably mounted to the axle 522 and the actuator is in direct operable communication with the handle portion 520, to allow the handle portion 520 to rotate about the axle 522.

Figure 7:
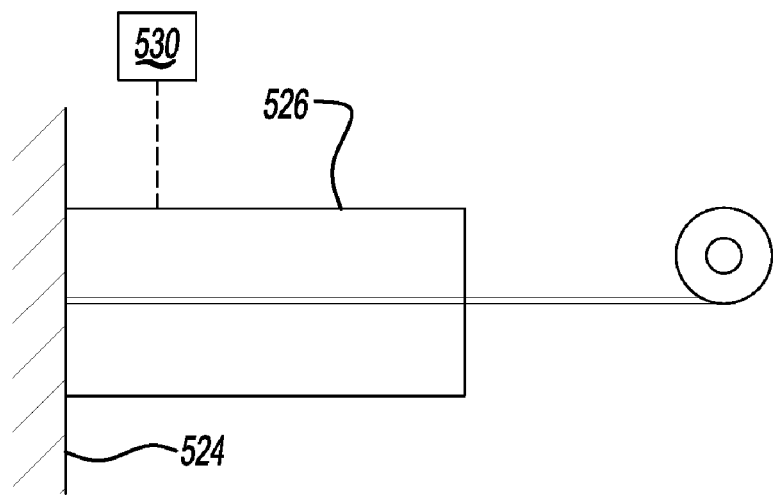
FIG. 7 is a schematic illustration of a pivot enabled by the actuator enabled self-presenting device of FIGS. 6A and 6B.

Turning now to FIG. 7, one of the axles 522 is illustrated in further detail. In this embodiment, the handle assembly 512 further includes an actuator 526. Upon receipt of an activation signal from the activation device 530, the actuator 526 is effective to provide rotation of the axle 522 in a first direction and move the handle portion 520 from the first position to a second position.

In another embodiment, the actuator 526 can be directly connected to the handle portion 520 to provide the rotation.

Referring back to FIG. 6A, the first position is where the handle portion 520 is in a stowed position relative to the surrounding surface. The second position is where the handle portion 520 is in a presented position relative to the surrounding surface and can be used by a passenger.

FIG. 6B is a side perspective view of the self-presented handle assembly 512 with the dashed lines illustrating the second position of the handle portion 520. Movement in the first direction caused by the actuator 526, therefore, is effective to move the handle portion 520 from the stowed to the presented position.

Figure 8:
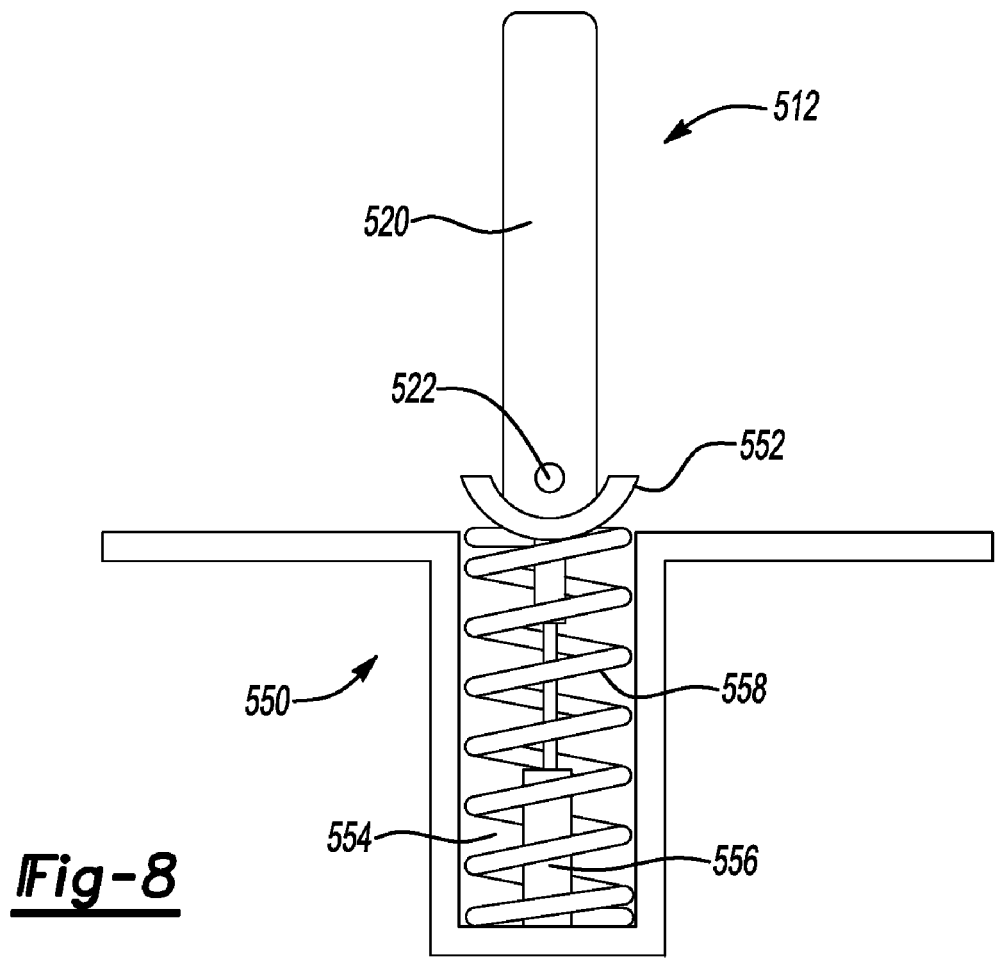
FIG. 8 is a side view of yet another exemplary embodiment of an actuator enabled self-presenting device according to the present invention.

In another embodiment, referring to FIG. 8, a bias spring 558 can be configured to move the handle portion 520 from the stowed to the presented position when not acted on by the actuator 556.

The detent mechanism 550 is operative to hold the handle portion 520 in the presented position, while still allowing the handle portion 520 to be moved manually from the presented position through the application of moderate force. Alternatively, the locking mechanism (not shown) creates a physical interlock which is operative to lock the handle portion 520 in the presented position, preventing the handle portion 520 from being moved manually, as such, the handle portion can only be moved by activating a release mechanism (i.e. deactivating the locking mechanism).

The detent mechanism 550 is configured to interact and interfere with the handle portion 520 being returned by the bias spring 558. The detent mechanism 550 comprises a catch 552 in slidable communication with a complementary cavity 554.

In operation, actuation of the self-presenting grab handle assembly 512 causes the axles 522 to rotate and move the handle portion 520. As the handle portion 520 reaches the presented position, an end of the handle encounters the catch 552, which has been forced outward by the bias spring 558. The shape of the catch 552 is configured to cradle the end of handle portion 520, effectively maintaining the handle portion 520 in the presented position.

While the detent mechanism 550 is effective to frictionally engage the handle portion 520 in the presented position, the shape of the catch 552 is further configured to permit some movement of the handle portion 520. For example, the handle portion 520 can rotate within the U-shape of the catch 552 to permit movement (e.g. fumbling or wiggling) as a passenger makes use of the handle, without allowing the handle to move completely out of the catch 552, which would cause the handle to stow.

Figure 9A:
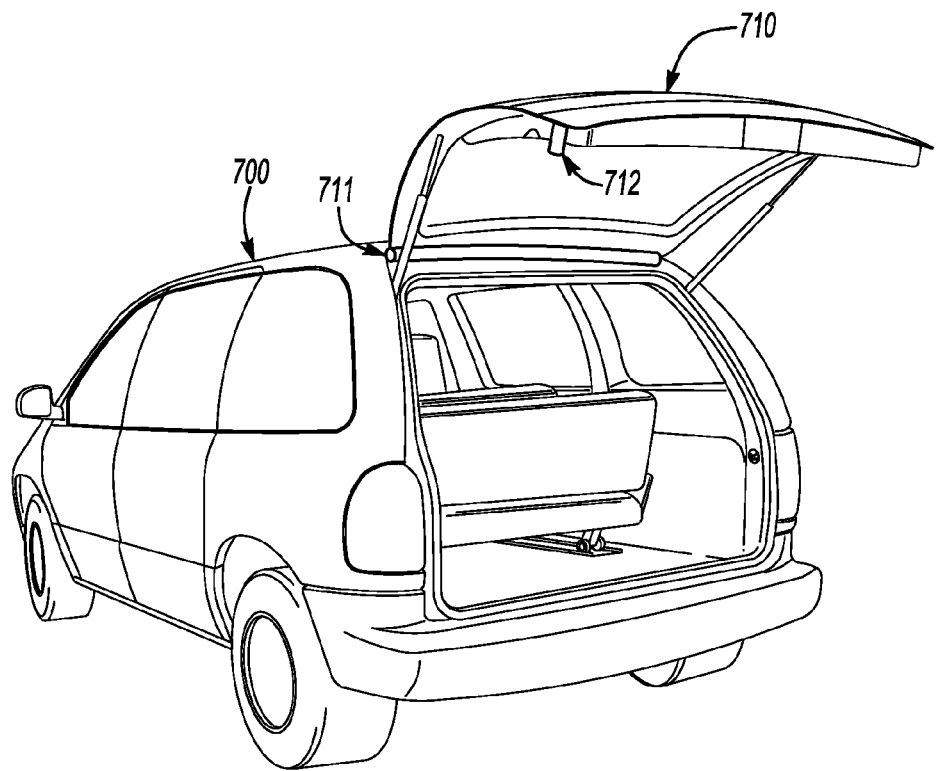
FIG. 9A is a perspective view of a vehicle including a vehicle rear door or tailgate in an open position, wherein the tailgate includes an exemplary embodiment of an actuator enabled self-presenting device according to the present invention in a presented or deployed configuration.
Figure 9B:
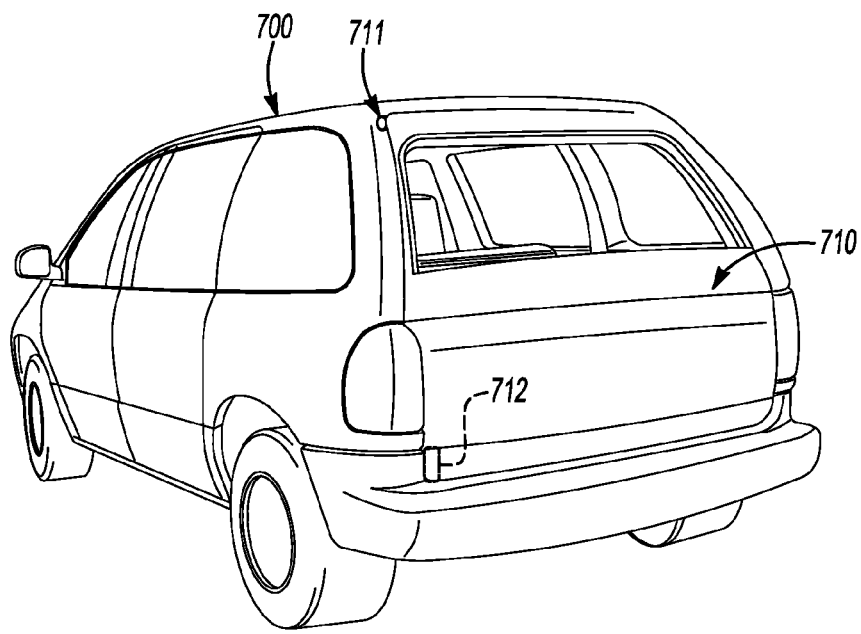
FIG. 9B is a perspective view of the vehicle illustrated in FIG. 9A including the vehicle rear door or tailgate in a closed position, wherein the tailgate includes the exemplary embodiment of the actuator enabled self-presenting device according to the present invention in a stowed configuration.

Referring to FIGS. 9A-9B, a vehicle 700 including a vehicle rear door, liftgate or tailgate 710 pivotable about a pivot point 711 from an open position to a closed position is illustrated. In FIG. 9A, the vehicle rear door or tailgate 710 is shown in the open position. A self-presenting device 712 is shown in a generally presented or deployed configuration, extending generally downward from the vehicle rear door or tailgate 710.

In FIG. 9B, the vehicle rear door or tailgate 710 is shown in the closed position. The self-presenting device 712 is shown in a generally stowed configuration, stowed within the vehicle rear door or tailgate 710.

Figure 10A:
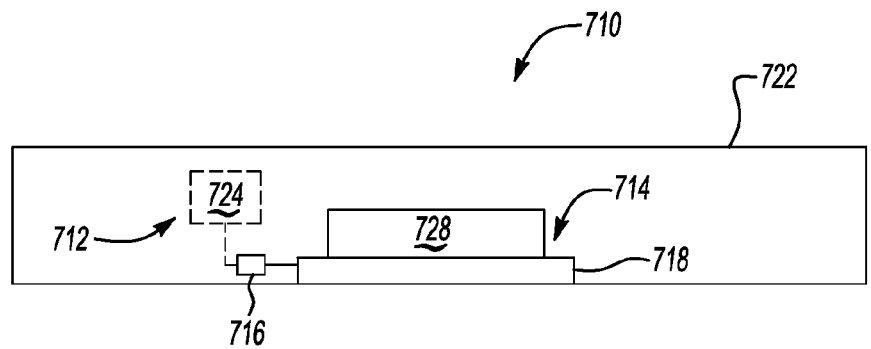
FIG. 10A is an end view of a tailgate including an exemplary embodiment of an actuator enabled self-presenting device according to the present invention in a stowed configuration.
Figure 10B:
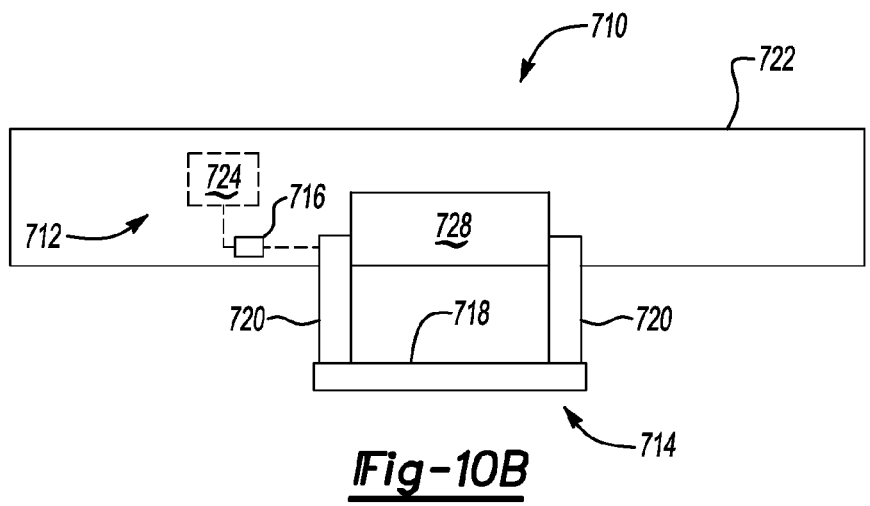
FIG. 10B is an end view of the tailgate including the exemplary embodiment of the actuator enabled self-presenting device of FIG. 10A in a presented or deployed configuration.
Figure 10C:
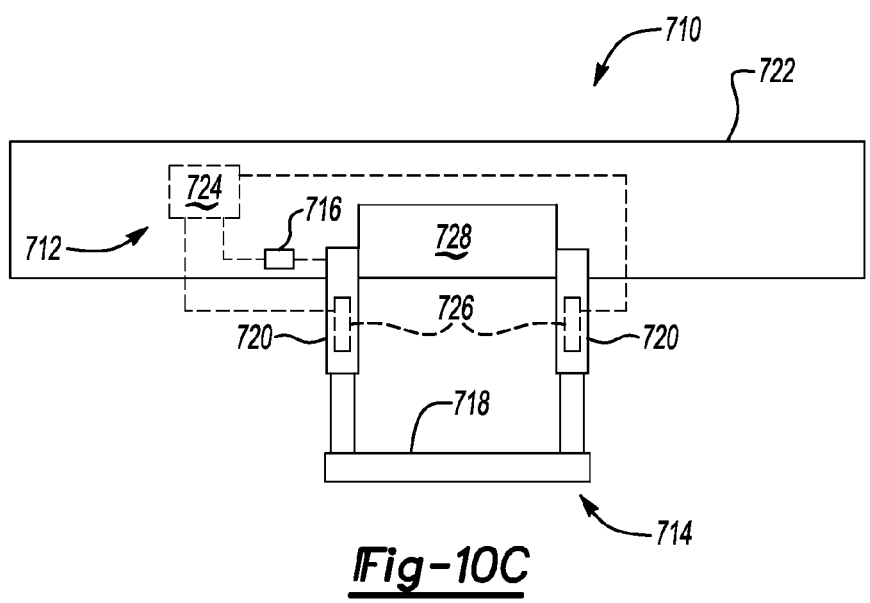
FIG. 10C is an end view of the tailgate including the exemplary embodiment of the actuator enabled self-presenting device of FIGS. 10A and 10B in an extended presented or extended deployed configuration.

Referring to FIGS. 10A-10C, an end or bottom view of the vehicle rear door or tailgate 710 is illustrated. In this embodiment, the self-presenting device is generally illustrated as reference numeral 712 and comprises a member 714 and an actuator, shown schematically as reference numeral 716. The member 714 includes a handle portion 718 and a pair of handle arms 720.

The self-presenting device 712, in this case, a tailgate assist handle, is in physical communication with a vehicle interior trim panel 722 and illustrated in a first position, i.e. a stowed position, in FIG. 10A. In this configuration, the actuator 716 is in a passive mode, i.e. where no activation signal is being applied to the actuator 716. Upon receipt of an activation signal from an activation device 724, however, actuation of the actuator 716 is effective to transition the member 714 to a second position, i.e. a presented or deployed position, as illustrated in FIG. 10B.

Finally, as illustrated in FIG. 10C, the self-presenting device 712 is transitioned to a third position, i.e. an extended presented or an extended deployed position. In this example, the pair of handle arms 720 is a pair of telescoping handle arms, which telescope from a retracted position, as illustrated in FIG. 10B, to an extended position, as illustrated in FIG. 10C.

The extension and retraction of the telescoping handle arms 720 is effected using another actuator, illustrated schematically as reference numeral 726, that is effected to transition the self-presenting device 712 from the presented or deployed position where the pair of handle arms 720 are in the retracted position, as illustrated in FIG. 10B, to the extended presented or extended deployed position where the pair of handle arms 720 are in the extended position, as illustrated in FIG. 10C.

In this configuration, the actuator 726 is in a passive mode when the pair of handle arms 720 is in the retracted position, as illustrated in FIG. 10B. Upon activation of an activation signal from an activation device 724, however, activation of the actuator 726 is effective to transition the pair of handle arms 720 from the retracted position, illustrated in FIG. 10B, to the extended position, illustrated in FIG. 10C.

In the illustrated embodiment, the activation device 724 that is operable to apply an activation signal to the actuator 726 is the same activation device that is operable to apply an activation signal to the actuator 716; however, a second separate activation device (not shown) could be employed to apply the activation signal to the actuator 726.

Upon deployment of the self-presenting device 712 to the third position, a user grabs the handle portion 718 to pull the tailgate door 710 to the closed position. A clearance pocket 728 is disposed in the vehicle interior trim panel 714, to provide clearance for a user's hand, such that, during operation, the user can grasp the handle portion 718 through a greater range of closure.

Figure 11A:
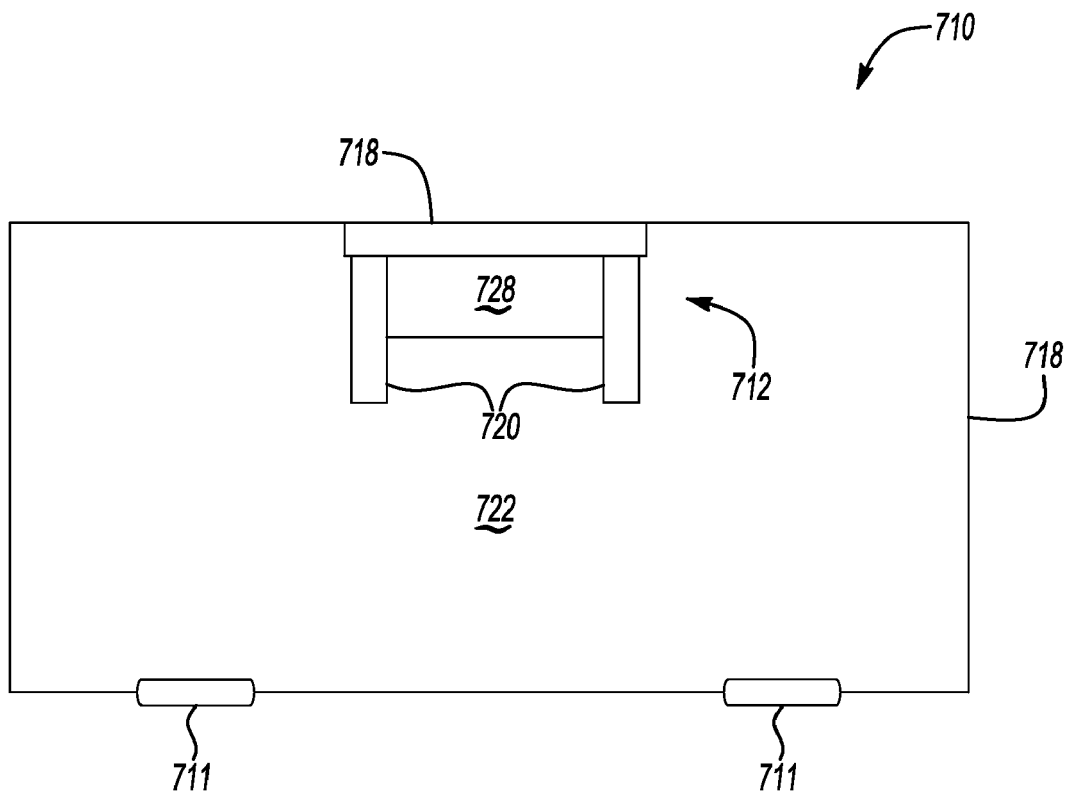
FIG. 11A is a plan view of an interior of a tailgate including an exemplary embodiment of an actuator enabled self-presenting device according to the present invention in a stowed configuration.
Figure 11B:
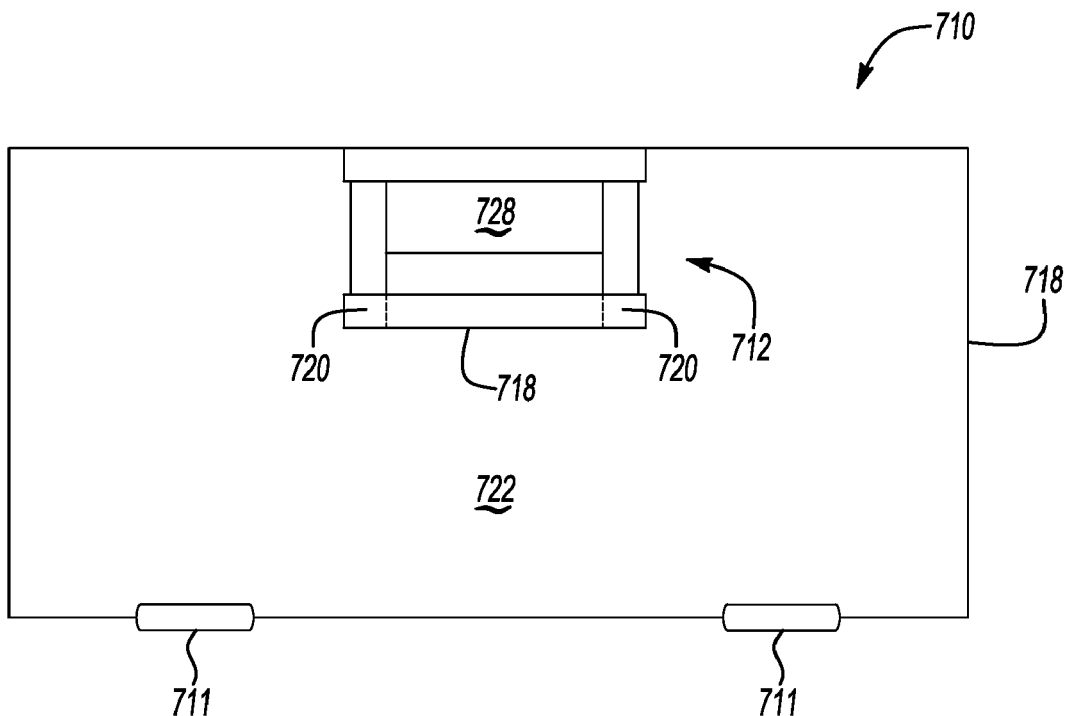
FIG. 11B is a plan view of the interior of the tailgate of FIG. 11A including the exemplary embodiment of the actuator enabled self-presenting device in a presented or deployed configuration.

An interior plan view of the vehicle rear door or tailgate 710 is illustrated in FIGS. 11A-11B. The vehicle rear door or tailgate 710 is shown pivoted upward about the pivot 711, in this example, a pair of hinges.

In FIG. 11A, the self-presenting device 712 including the handle 718 and the pair of handle arms 720 is shown in a stowed position, wherein the self-presenting device 712 is stowed within or substantially flush to the interior trim panel 722.

In FIG. 11B, the self-presenting device 712 including the handle 718 and the pair of handle arms 720 are shown in a presented or deployed position, wherein the self-presenting device 712 extends outwardly from the interior trim panel 722 to present the handle 718 to the user for use.

FIGS. 12A-12E schematically illustrates alternate configurations of the self-presenting device 712.

Figure 12A:
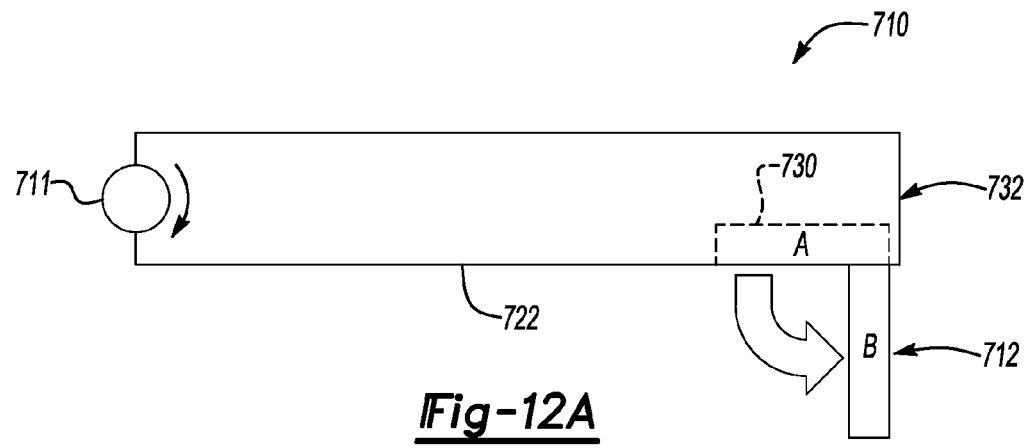
FIG. 12A is a side view of a tailgate including an exemplary embodiment of an actuator enabled self-presenting device according to the present invention.

In FIG. 12A, the self-presenting device 712 is operable to transition from a stowed position A to a presented or deployed position B upon activation of the actuator, such that the self-presenting device 712 pivots outward from a storage pocket 730 in the interior trim panel 722 and downward toward an end 732 of the vehicle rear door or tailgate 710.

Figure 12B:
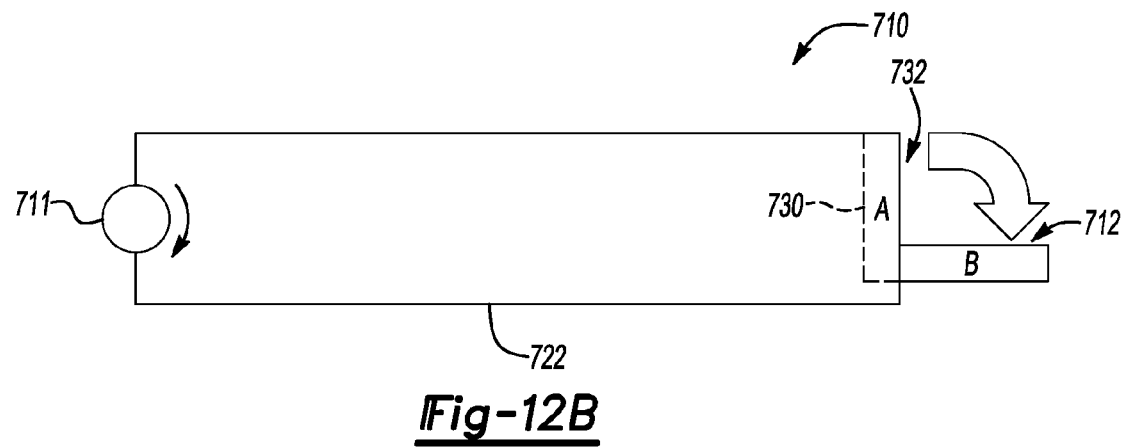
FIG. 12B is a side view of a tailgate including another exemplary embodiment of an actuator enabled self-presenting device according to the present invention.

In FIG. 12B, the self-presenting device 712 is operable to transition from a stowed position A to a presented or deployed position B upon activation of the actuator, such that the self-presenting device 712 pivots outward from the end 732 of the vehicle rear door or tailgate 710 and downward toward the interior trim panel 722.

Figure 12C:
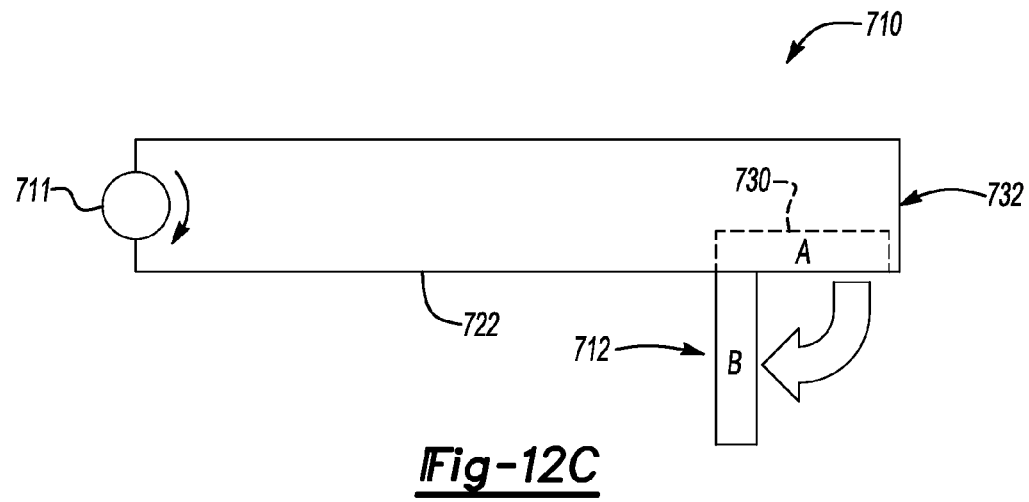
FIG. 12C is a side view of a tailgate including yet another exemplary embodiment of an actuator enabled self-presenting device according to the present invention.

In FIG. 12C, the self-presenting device 712 is operable to transition from a stowed position A to a presented or deployed position B upon activation of the actuator, such that the self-presenting device 712 pivots outward from the pocket 730 in the interior trim panel 722 and upward from the end 732 of the vehicle rear door or tailgate 710.

Figure 12D:
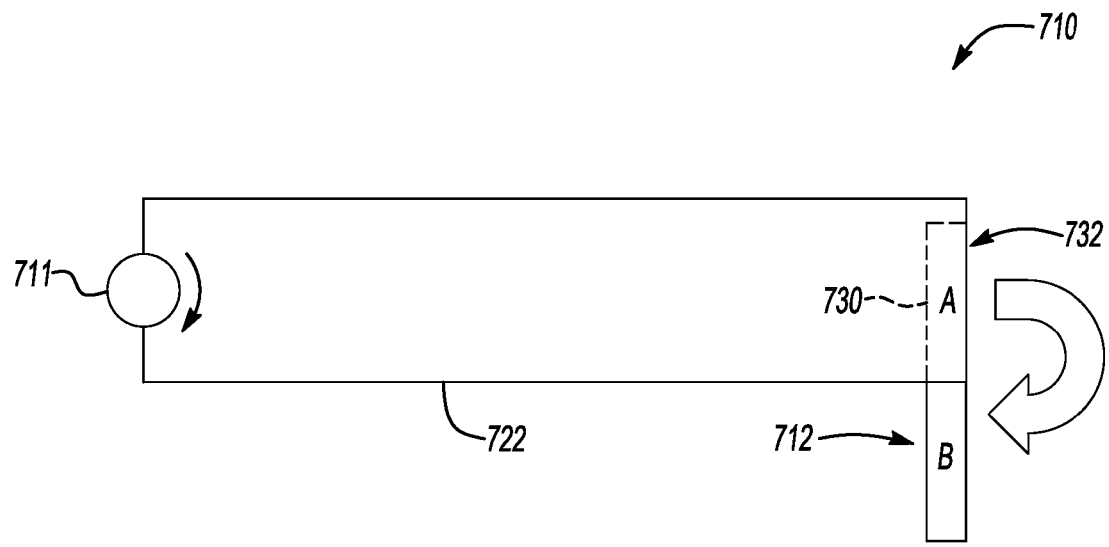
FIG. 12D is a side view of a tailgate including yet another exemplary embodiment of an actuator enabled self-presenting device according to the present invention.

In FIG. 12D, the self-presenting device 712 is operable to transition from a stowed position A to a presented or deployed position B upon activation of the actuator, such that the self-presenting device 712 pivots outward from the end 732 of the vehicle rear door or tailgate 710 and inward toward the interior trim panel 722.

Figure 12E:
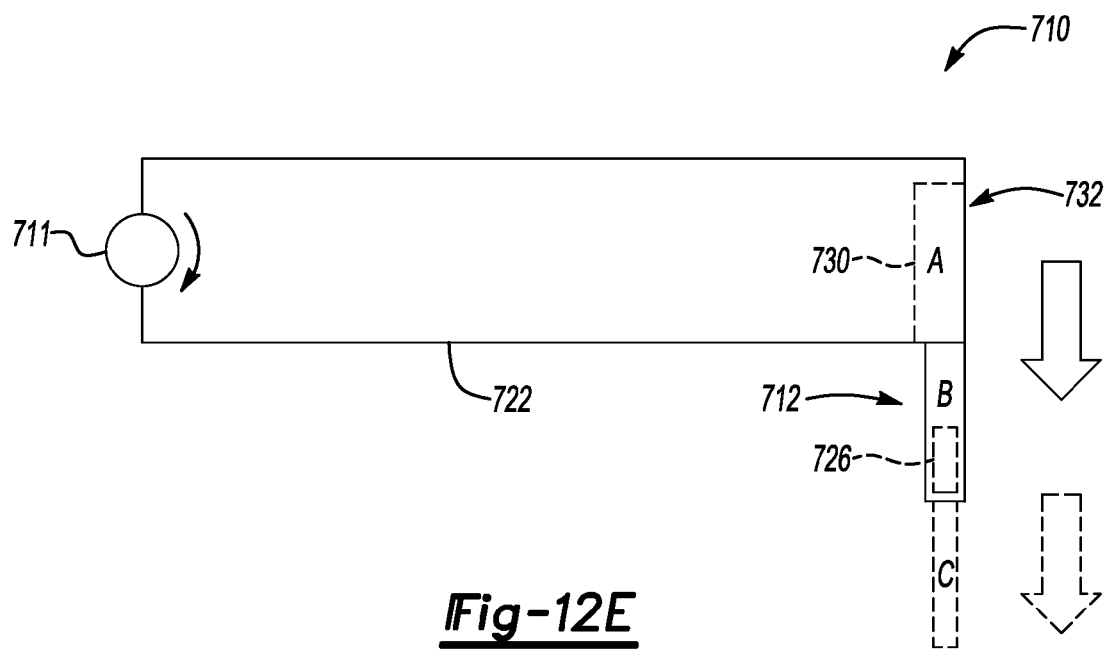
FIG. 12E is a side view of a tailgate including yet another exemplary embodiment of an actuator enabled self-presenting device according to the present invention.

In FIG. 12E, the self-presenting device 712 is operable to transition from a stowed position A to a presented or deployed position B upon activation of the actuator, such that the self-presenting device 712 slides downward from within the vehicle rear door or tailgate 710. In this example, the self-presenting device 712 includes a telescoping feature that further extends the self-presenting device to an extended presented or extended deployed position C upon activation of an actuator 726, as illustrated previously in FIG. 10C.

A method of self-presenting a device in a vehicle interior or on the vehicle exterior comprises activating the actuator in operative communication with the member, wherein the actuator is effective to transition the member from a first form to a second form. Transitioning the member from the first form to the second form is configured to change the member from a stowed position within and/or against a vehicle interior/exterior component, such as a roof line, A-pillar, tailgate interior trim panel, or the like, to a presented position in the vehicle's interior compartment space (or outward from the exterior), wherein the member will now be accessible for use by a driver and/or passenger.

Further, a method of self-stowing a device in a vehicle interior or on the vehicle exterior comprises activating an actuator in operative communication with a member, wherein the actuator is effective to transition the member from a first form to a second form. Transitioning the member from the first form to the second form is configured to transition the member from a presented position in a vehicle's interior compartment space (or outward from an exterior vehicle surface), wherein the member is accessible for use by a user to a stowed position within and/or against a vehicle interior/exterior component, such as a roof line, A-pillar, tailgate interior trim panel, or the like.

As discussed above, the self-presenting devices are stowed substantially flush with or within an associated vehicle component, for example, a vehicle door or tailgate, and presented or deployed upon activation of an actuator. These devices, however, could all be configured as self-stowing devices, i.e. presented for use when the actuator is in a passive state and stowed upon activation of the actuator. Alternatively, these devices could be both self-presenting and self-stowing based on consecutive activations of the actuator.

As described above, an activation device can be used to apply the activation signal to the actuator(s) in an exemplary self-actuating device. The activation device can be operated in a variety of ways. For example, in one embodiment, use of a remote key fob, typically used to unlock a vehicle door, could also be configured to initiate the activation signal and present and/or stow one or more self-actuating devices. Likewise, a wireless signal transmitter in the key fob in combination with an activation device sensor could be used to automatically activate the actuator when the key fob is brought into physical proximity to the self-actuating device, thereby eliminating the need to press key fob buttons.

In another embodiment, the activation signal could be manually activated. For example, inserting the vehicle key into a key hole in the vehicle door, or opening the door itself, could initiate the activation signal. Similarly, a push button or the like could be disposed adjacent the self-actuating device, wherein depressing the push button activates the activation signal in order to present and/or stow the device. In any of the above methods, the activation signal can be turned off by time-out of a timer in communication with the self-actuating device, or through the happening of some event, for example, closing of the vehicle door, closing of the liftgate or the vehicle being placed in gear, to deactivate the activation signal and return the member to the first form wherein the member is stowed, and optionally concealed, or presented.

Activation of the actuators can also be done manually, i.e., without the use of an activation device. By utilizing particular properties of the actuators, they can be activated by a vehicle operator or passenger.

To reiterate, although the actuator enabled self-actuating devices illustrated are shown with respect to a vehicle grab handle, it is to be understood that the self-actuating device can be used for any functional component of a vehicle, other transportation means, or even non-transportation applications, such as luggage, containers, drawers, storage compartments, and the like. Such suitable self-actuating devices include, but are not limited to, garment hooks, release handles for the trunk, fuel-door, hood, and the like, handles for doors, covers, tailgates and the like, and other components where self-presentation may be desired.

As previously described, suitable actuators for the self-actuating devices include, without limitation, mechanically controlled actuators, electrically controlled actuators (electrohydraulic, electromechanical, or electromagnetic), hydraulically controlled actuators, pneumatically controlled actuators, magnetically controlled actuators, and/or any combination of the aforementioned.

As stated above, the self-actuating devices as disclosed herein advantageously employ actuators to reversibly present and stow a functional component. Moreover, the self-actuating devices described herein are also of low-cost and of easily adaptable designs that can be integrated with limited changes to the existing vehicle interior/exterior structure.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle comprising:
    a body defining an interior compartment of the vehicle;
    a tailgate attached to the body and configured for pivoting between an open position and a closed position;
    a trim panel disposed on the tailgate and within the interior compartment of the vehicle when the tailgate is disposed in the closed position; and
    a self-actuating device in physical communication with the trim panel and configured for reversibly presenting for use to assist in pivoting the tailgate between the open position and the closed position, wherein the self-actuating device includes;
        a handle configured to reversibly transition between a first form wherein the handle is flush to the trim panel and the handle is stowed, and a second form wherein the handle protrudes from the trim panel and the handle is presented for use;
        an activation device configured for providing an activation signal; and
        at least one actuator in operable communication with each of the handle and the activation device and configured to receive the activation signal from the activation device to thereby reversibly transition the handle between the first form and the second form.

2. The vehicle as recited in claim 1, further including a detent mechanism in physical communication with the handle and operable to maintain the handle in one of the first form and the second form when the activation signal is discontinued.

3. The vehicle as recited in claim 2, wherein the detent mechanism includes a catch that engages the handle to maintain the handle in the one of the first form and the second form.

4. The vehicle as recited in claim 3, further including a second actuator in operable communication with the catch, wherein the catch is slidable within a complementary cavity in response to a signal being applied to the second actuator.

5. The vehicle as recited in claim 4, wherein the handle is moveable within the catch upon manual application of a force.

6. The vehicle of claim 1, wherein the at least one actuator is an electrically controlled actuator.

7. The vehicle of claim 1, wherein the at least one actuator includes one of an electrically controlled actuator, an electrically controlled electrohydraulic actuator, an electrically controlled electromechanical actuator, an electrically controlled electromagnetic actuator, a mechanically controlled actuator, a hydraulically controlled actuator, a pneumatically controlled actuator, a magnetically controlled actuator, and combinations thereof.

8. The vehicle as recited in claim 1, wherein the handle is further configured to reversibly transition between the first form, the second form, and a third form, wherein the second form presents the handle at a first distance and the third form extends the handle from the first distance to a second distance greater than the first distance.

9. The vehicle as recited in claim 8, wherein the handle includes a pair of arm portions.

10. The vehicle as recited in claim 9, wherein the pair of arm portions is rotatable about an axis to transition the handle between the first form and the second form.

11. The vehicle as recited in claim 10, wherein the pair of arm portions is extendable to present the handle in the third form.

12. The vehicle as recited in claim 1, further including a locking mechanism in physical communication with the handle and operable to lock the handle in one of the first form and the second form when the activation signal is discontinued.

13. The vehicle as recited in claim 1, wherein the self-actuating device is disposed within the tailgate and the handle is in one of the first form and the second form when the tailgate is disposed in the open position and the handle is in the other of the first form and the second form when the tailgate is disposed in the closed position.

14. The vehicle as recited in claim 1, wherein the activation device generates the activation signal based upon a remote input.

15. The vehicle as recited in claim 14, wherein the remote input is generated based on proximity of a key fob.

16. The vehicle as recited in claim 1, wherein the activation device generates the activation signal based upon a manual input.

17. The vehicle as recited in claim 16, wherein the manual input is generated by pressing a key fob.

18. A self-actuating device, the self-actuating device comprising:
    a member in physical communication with a vehicle surface and including a handle portion, wherein the handle portion is configured to have at least a first form wherein the handle portion of the member is flush to the vehicle surface and the member is stowed and a second form wherein the handle portion protrudes from the vehicle surface and the member is presented for use;

at least one actuator in operable communication with the member, wherein the at least one actuator includes one of a mechanically controlled actuator, an electrically controlled electrohydraulic actuator, an electrically controlled electromechanical actuator, an electrically controlled electromagnetic actuator, a hydraulically controlled actuator, a pneumatically controlled actuator, and a magnetically controlled actuator;

an activation device in communication with the at least one actuator, wherein the at least one actuator is configured to receive an activation signal from the activation device and wherein activation of the at least one actuator is effective to transition the member from one of the first form and the second form to the other of the first form and the second form;

a detent mechanism in physical communication with the member wherein the detent mechanism is operable to maintain the member in one of the first form and the second form when the activation signal is discontinued, wherein the detent mechanism includes a catch that engages the member to maintain the member in the one of the first form and the second form; and a second actuator in operable communication with the catch, wherein the catch is slidable within a complementary cavity in response to a signal being applied to the second actuator and wherein the member is moveable within the catch upon manual application of a force.

* * * * *